US012259105B2

(12) United States Patent
Li et al.

(10) Patent No.: US 12,259,105 B2
(45) Date of Patent: Mar. 25, 2025

(54) LIGHT HEAD, LIGHTING ASSEMBLY, AND FLAMELESS CANDLE

(71) Applicants: Xiamen Global Selection Imp & Exp Co Ltd, Xiamen (CN); Kaiqin Huang, Xiamen (CN)

(72) Inventors: Liangliang Li, Xiamen (CN); Xiangzhen Huang, Xiamen (CN); Kaiqin Huang, Xiamen (CN)

(73) Assignees: Xiamen Global Selection Imp & Exp Co Ltd, Xiamen (CN); Kaiqin Huang, Xiamen (CN)

( * ) Notice: Subject to any disclaimer, the term of this patent is extended or adjusted under 35 U.S.C. 154(b) by 1 day.

(21) Appl. No.: 18/341,724

(22) Filed: Jun. 26, 2023

(65) Prior Publication Data

US 2024/0384843 A1 Nov. 21, 2024

(30) Foreign Application Priority Data

May 18, 2023 (CN) ......................... 202321209166.5

(51) Int. Cl.

| | |
|---|---|
| ***F21S 6/00*** | (2006.01) |
| ***F21S 9/02*** | (2006.01) |
| ***F21V 17/10*** | (2006.01) |
| ***F21V 31/00*** | (2006.01) |
| *F21Y 115/10* | (2016.01) |

(52) U.S. Cl.

CPC ................. *F21S 6/001* (2013.01); *F21S 9/02* (2013.01); *F21V 17/104* (2013.01); *F21V 31/005* (2013.01); *F21Y 2115/10* (2016.08)

(58) Field of Classification Search

CPC ........... F21S 6/001; F21S 9/02; F21V 17/104; F21V 31/005; F21Y 2115/10

USPC .......................................................... 362/392

See application file for complete search history.

(56) References Cited

U.S. PATENT DOCUMENTS

2016/0146414 A1* 5/2016 Dong ...................... F21S 6/001 362/372

* cited by examiner

*Primary Examiner* — Joseph L Williams
*Assistant Examiner* — Hana S Featherly
(74) *Attorney, Agent, or Firm* — Calfee, Halter & Griswold LLP

(57) ABSTRACT

A light head includes a light head housing and a light source. The light head housing is made of silicone material by integrally-forming, the light head housing includes an inner chamber and a through hole for connecting the inner chamber to the outside, the inner chamber includes a large chamber for accommodating the light source and a light-transmitting chamber connected with the large chamber. A lighting assembly is further proposed, including a lighting housing and the above-mentioned light head, wherein the light head is arranged at one end of the lighting housing, and the lighting housing includes a base for holding the hollow sleeve, the base is provided with a hollow sleeve mounting hole, the base further includes a hollow silicone plug.

15 Claims, 3 Drawing Sheets

LIGHT HEAD, LIGHTING ASSEMBLY, AND FLAMELESS CANDLE

CROSS REFERENCE OF RELATED APPLICATION

This application claims priority of a Chinese patent application No. 2023212091665 filed on May 18, 2023, the entirety of which is incorporated by reference.

TECHNICAL FIELD

The present disclosure relates to the technical field of a flameless candle, in particular to a light head for a flameless candle, a lighting assembly and a flameless candle.

BACKGROUND

Traditional candles are ignited by an open flame, which produces a large amount of heat and poses a certain safety hazard due to the risk of tipping over and igniting flammable materials. The large amount of black smoke generated during combustion causes environmental pollution, and the melted wax can burn the user. The light intensity and service life are further difficult to meet practical needs.

With the improvement of people's living standards, candles are no longer just used as lighting tools. They are often used to change the indoor atmosphere, and the soft candlelight can further bring pleasure and relaxation to people. Currently, flameless candles are gradually replacing traditional candles. The flameless candles not only have lighting functions but can further be designed to have viewing and entertainment functions, such as electronic flashing candles, music candles, and simulated kerosene lamps. However, there is currently no product that effectively protects the body structure of flameless candles.

The U.S. Pat. No. 10,436,396B2 discloses an artificial candle, comprising a hollow cylinder, an electric wire, and a light bulb. The light bulb comprises a light source with a long strip shape, a cup sleeved on and fixed to the electric wire at a position near the first end of the wire, an outer cover covered on the cup, and an inner cover sleeved on the light source and defining a receiving space for receiving a part of the light source and the second end of the electric wire. The light transmitted of the inner cover is smaller than that of the outer cover and that of the cup. The inner cover is configured for reflecting light emitted from the part, received in the receiving space, of the light source towards the wire holder and an exposed part of the electric wire. A simulation effect of the flame is improved.

However, the above-mentioned technical solution has the following defects: the part of the wire that is connected to the housing and the wire support of the artificial candle is exposed without protection, making it vulnerable to damage. Additionally, the artificial candle does not have a lighting assembly to protect it, and water can leak into the lamp body when it encounters water, making it unusable or causing dangerous accidents. Therefore, the overall safety of the artificial candle is insufficient.

SUMMARY

In view of the shortcomings of the prior technology, the present disclosure aims to provide a light head, a lighting assembly and a flameless candle with the advantage of having a lighting assembly protecting the flameless candle.

The above technical purpose of the present disclosure is realized by the following technical solutions:

In one aspect, the present disclosure proposes a light head for a flameless candle comprising a light head housing and a light source, the light head housing is made of silicone material by integrally-forming, the light head housing comprises an inner chamber and a through hole for connecting the inner chamber to the outside, the inner chamber comprises a large chamber for accommodating the light source and a light-transmitting chamber connected with the large chamber.

Through the above technical scheme, the light head housing is made of silicone material by integrally-forming, which makes the light head difficult to damage and waterproof, safe to use, and the light-transmitting chamber can reserve a certain distance for the light to make the light source emit light more evenly, the light source works inside the light head housing and cooperates with the light head housing to simulate the real candle flame, the overall structure of the light head is simple, and there is no need to produce an open flame, which has a high degree of simulation of the candle flame.

In some embodiments, an inner diameter of the light-transmitting chamber is smaller than an inner diameter of the large chamber, and the inner diameter of the through hole is smaller than the inner diameter of the large chamber.

In some embodiments, the light source is installed in the large chamber, the light source comprises an LED and a light transmitting portion, and the LED is provided in the light transmitting portion, the light transmitting portion is provided in the large chamber, and an outer diameter size of the light transmitting portion is slightly smaller than the inner diameter size of the large chamber.

Through the above technical scheme, the light emitted by the LED can fill the entire light head to the maximum extent and scatter outward through the light head housing, which can bring a better visual effect of simulating a candle flame. The upper edge of the light transmitting portion is semi-elliptical, and the LED part cannot be moved up and down in the large chamber due to the light transmitting portion, so as to maintain the optimal luminous lamp effect.

In some embodiments, the flameless candle further comprises a hollow sleeve, an end of the hollow sleeve is inserted into the through hole and interference-fitted with the through hole, and a wire for the light source is further comprised to extend through the large chamber from the interior of the hollow sleeve.

Through the above technology, the hollow sleeve can protect the wire for the light source. The one end of the hollow sleeve inserted into the through hole can make the light source emit light like the wick of a candle, thereby improving the simulation of the flameless candle. The interference fit between the hollow sleeve and the through hole can achieve the circumferential fixation of the hollow sleeve and the light head, and further achieve the effect of waterproof sealing.

In some embodiments, a jointing part between the large chamber and the light-transmitting chamber comprises a position-limiting portion for limiting the installation position of the light source.

In some embodiments, the position-limiting portion has a concave profile matching with the outline of the light source.

Through the above technology, the position-limiting portion can clip the light source component, and the position-limiting portion has a concave profile matching with the outline of the light source, which can make the overall light source component simple to install inside the light head, so as to maintain the consistency of the installation position of the light source component.

According to a second aspect of the present disclosure, a lighting assembly for a flameless candle comprises a lighting housing and a light head as described above, the light head being provided at one end of the lighting housing. The lighting housing comprises a base for holding the hollow sleeve, the base is provided with a hollow sleeve mounting hole, the base further comprises a hollow silicone plug, the hollow silicone plug is sealingly fitted with the hollow sleeve mounting hole, and the inner diameter of the hollow silicone plug is equal to or slightly smaller than the outer diameter of the hollow sleeve of the light head, the periphery of the hollow sleeve mounting hole is further provided with a secondary sealing groove, and the hollow silicone plug is provided with an annular sealing bulge corresponding to the secondary sealing groove.

Through the above technical solution, the hollow silicone plug is sealed with the mounting hole, and the inner diameter of the hollow silicone plug is sealed with the outer diameter of the hollow sleeve of the light head, so as to realize the fixed connection of the lighting housing, the hollow sleeve and the hollow silicone plug, and ensure the waterproof performance among the three. The secondary sealing groove of the light head mounting hole and the annular sealing bulge of the hollow silicone plug can realize the fixed connection between the hollow silicone plug and the inside of the lighting housing, and further improve the waterproof performance and protect the internal components of the housing.

According to a third aspect of the present disclosure, a flameless candle is proposed, comprising the lighting assembly for a flameless candle.

In some embodiments, the flameless candle further comprises a PCBA circuit board, a battery compartment and a rotary cover, the interior hollow of the lighting housing, the wire for the light source, the PCBA circuit board and the battery compartment are connected sequentially and are all provided within the interior of the lighting housing, and the rotary cover is detachably connected to the bottom of the lighting housing, the battery compartment is provided with a pair of battery slots accommodating batteries, and a sealing cover is provided at the fit of the battery slots and the PCBA circuit board, the outer diameter of the sealing cover is sealingly fitted with the inner diameter of the lighting housing, a switch slot is provided at the outer surface of the sealing cover close to the battery slots, and a limited sliding grooved rail is provided in the switch slot, circuit-on/off switch installed in the switch slot is used for controlling the circuit-on/off by moving back and forth along the limited sliding grooved rail.

Through the above technical scheme, the battery compartment provides power for light source, the PCBA circuit board controls the light source, the rotary cover can be removed to facilitate the timely replacement of the battery, the battery slots are used to accommodate the batteries, the switch slot accommodates the limited sliding grooved rail, the limited sliding grooved rail enables the circuit-on/off switch to move back and forth in the sliding grooved rail, the circuit-on/off switch is used for controlling the circuit-on/off.

In some embodiments, the rotary cover is provided with a sealing ring of the lighting housing, the rotary cover has at least a pair of grip grooves, the grip grooves for locking or unlocking the rotary cover.

Through the above technical scheme, the sealing ring at the fit of the rotary cover and the lighting housing can play a buffer role when the rotary cover rotates and can be internally waterproof to protect the battery compartment. The grip grooves on the surface of the rotary cover is used to lock or unlock the rotary cover.

In summary, the present disclosure has the following advantages compared with the prior art:

The light head housing of the present disclosure is made of silicone material by integrally-forming, the light head housing comprises an inner chamber and a through hole for connecting the inner chamber to the outside, the inner chamber comprises a large chamber for accommodating the light source and a light-transmitting chamber connected with the large chamber. The lighting assembly comprises the lighting housing the light head as described above, the light head being provided at one end of the lighting housing. The lighting housing comprises a base for holding the hollow sleeve, the base is provided with a hollow sleeve mounting hole, the base further comprises a hollow silicone plug, the hollow silicone plug is sealingly fitted with the hollow sleeve mounting hole, and the inner diameter of the hollow silicone plug is equal to or slightly smaller than the outer diameter of the hollow sleeve of the light head. Double seal maintains the fixed connection between the lighting housing, hollow sleeve and hollow silicone plug. The periphery of the hollow sleeve mounting hole is further provided with a secondary sealing groove, and the hollow silicone plug is provided with an annular sealing bulge corresponding to the secondary sealing groove to maintain the fixed connection between the hollow silicone plug and the inside of the lighting housing. And ensure the sealing between the lighting housing, hollow sleeve and hollow silicone plug to achieve internal waterproof effect.

BRIEF DESCRIPTION OF THE DRAWINGS

Comprising accompanying drawings to provide a further understanding of the embodiments and the drawings are incorporated into this specification and form part of this specification. The drawings illustrate the embodiments and are used in conjunction with the description to explain the principles of the present disclosure. Many expected advantages of other embodiments and embodiments will be easily understood because they are better understood by referring to the following detailed description. By reading the detailed description of the non-limiting embodiments made with reference to the following accompanying drawings, other features, purposes and advantages of the present application will become more apparent.

Figure 1:
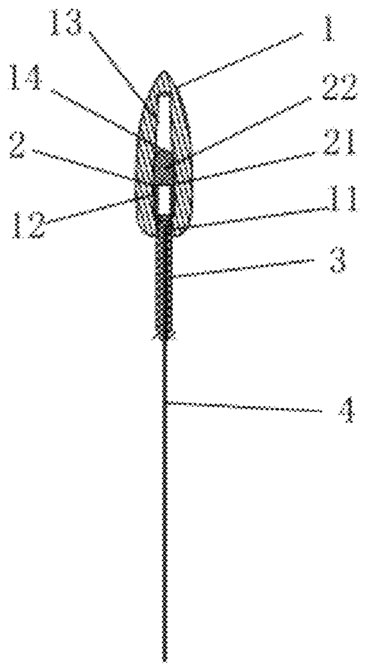
FIG. 1 is a sectional view of a light head according to an embodiment of the present disclosure.

Note: 1—light head housing; 2—light source; 11—through hole; 12—large chamber; 13—light-transmitting chamber; 14—position-limiting portion; 21—LED; 22—light transmitting portion; 3—hollow sleeve; 4—a wire for the light source; 5—lighting housing; 51—base; 511—hollow sleeve mounting hole; 512—hollow silicone plug; 513—secondary sealing groove; 6—PCBA circuit board; 7—battery compartment; 8—rotary cover; 81—sealing ring; 82—grasp groove.

DETAILED DESCRIPTION OF THE DISCLOSURE

In the description of this present disclosure, it should be noted that the terms "center", "longitudinal", "horizontal", "length", "width", "thickness", "top", "bottom", "front", "rear", "left", "right", "vertical", "horizontal", "top", "bottom", "inside", "outside", "clockwise", "counterclockwise", "axial", "radial", "circumferential", and other directional or positional relationships indicated are based on the directional or positional relationships shown in the drawings. They are only for the convenience of describing and simplifying the description of this present disclosure, and do not indicate or imply that the device or component referred to must have a specific orientation or be constructed and operated in a specific orientation. Therefore, they cannot be understood as limiting the present disclosure.

In this present disclosure, unless otherwise specified and limited, the terms "installation", "connection", "fixing", etc., should be interpreted broadly. For example, they can be fixedly connected or detachably connected, or integrated; they can be mechanically connected or electrically connected; they can be directly connected or indirectly connected through an intermediate medium, and can be the interconnection within two components or the interaction between two components, unless otherwise specified. For ordinary technicians in this field, they can understand the specific meanings of the above terms in this present disclosure according to specific circumstances.

This application is to be further described in detail below in combination with the accompanying drawings and embodiments. It is understood that the specific embodiments described herein are only used to explain the relevant application, not to define the application. It should further be noted that only the parts of the application are shown for ease of description.

Embodiments

FIG. 1 shows a sectional view of the light head according to an embodiment of the present disclosure. As shown in FIG. 1, the light head comprises a light head housing 1 and a light source 2. The light head housing 1 is made of silicone material by integrally-forming, the light head housing 1 is milky white, and in other examples, the light head housing 1 may be milky or yellowish white. The light source 2 is set in the interior of the light head housing 1, through the silicone material light head housing setting makes the light head be not easy to damage and waterproof, the light source 2 can make the light head housing 1 more evenly, the light source 2 works inside the light head housing 1 and cooperates with the light head housing 1 to simulate the real candle flame, the overall structure of the light head is simple, and there is no need to produce an open flame, which has a high degree of simulation of the candle flame.

Figure 2:
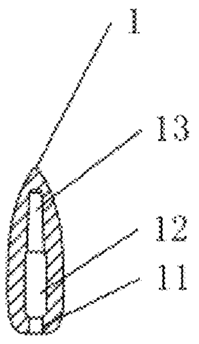
FIG. 2 is a sectional view of the light head housing of a specific embodiment of the present disclosure.

FIG. 2 illustrates a sectional view of the light head housing according to a specific embodiment of the present disclosure. As shown in FIG. 2, the light head housing 1 comprises an inner chamber and a through hole 11 for connecting the inner chamber to the outside, the inner chamber comprises a large chamber 12 for accommodating the light source and a light-transmitting chamber 13 connected with the large chamber 12, where an inner diameter of the light-transmitting chamber 13 is smaller than an inner diameter of the large chamber 12, and the inner diameter of the through hole 11 is smaller than the inner diameter of the large chamber 12, and the light-transmitting chamber 13 can reserve a certain distance for the light to make the light source emit light more evenly.

In a specific embodiment, referring to FIG. 1, the light source 2 is installed in the large chamber 12, the light source comprises the LED 21 and the light transmitting portion 22, and the LED 21 is provided in the light transmitting portion 22. The light transmitting portion 22 is arranged in the large chamber 12, and an outer diameter of the light transmitting portion 22 is slightly smaller than the inner diameter of the large chamber 12. The light emitted by the LED 21 can fill the entire light head to the maximum extent and scatter outward through the light head housing, which can bring a better visual effect of simulating a candle flame. The upper edge of the light transmitting portion 22 is semi-elliptical, and the LED 21 member cannot move up and down in the light transmitting portion 22 restricted by the large chamber 12 to maintain stable light emitting.

In the specific embodiment, referring to FIG. 1, the hollow sleeve 3 is further comprised, an end of the hollow sleeve 3 is inserted into the through hole 11 and interference-fitted with the through hole 11 to maintain the circumferential fixing of the hollow sleeve 3 and the light head housing 1, and a wire for the light source 4 is further comprised to extend through the large chamber 12 from the interior of the hollow sleeve 3, and there is a gap between the bottom end of the light head housing 1 and the hollow sleeve mounting hole 511 for the hollow sleeve 3 to be exposed. In this embodiment, the length of the exposed hollow sleeve 3 is 2~7 mm, and in other embodiments, its length can be passively adjusted.

In this embodiment, the hollow sleeve 3 is made of plastic, which is black. The hollow sleeve 3 can protect the wire for the light source 4. The one end of the hollow sleeve 3 inserted into the through hole 11 can make the light source 2 emit light like the wick of a candle, thereby improving the simulation of the flameless candle. The interference fit between the hollow sleeve 3 and the through hole 11 can achieve the circumferential fixation of the hollow sleeve 3 and the light head, and further achieve the effect of waterproof sealing.

In the specific embodiment, referring to FIG. 1, a jointing part between the large chamber 12 and the light-transmitting chamber 13 comprises a position-limiting portion 14 for limiting the installation position of the light source 2, and the position-limiting portion 14 has a concave profile matching with the outline of the light source 2. The position-limiting portion 14 can clip the light source component, and the position-limiting portion 14 has a concave profile matching with the outline of the light source 2, which can make the overall light source component simple to install inside the light head, so as to maintain the consistency of the installation position of the light source component.

Figure 3:
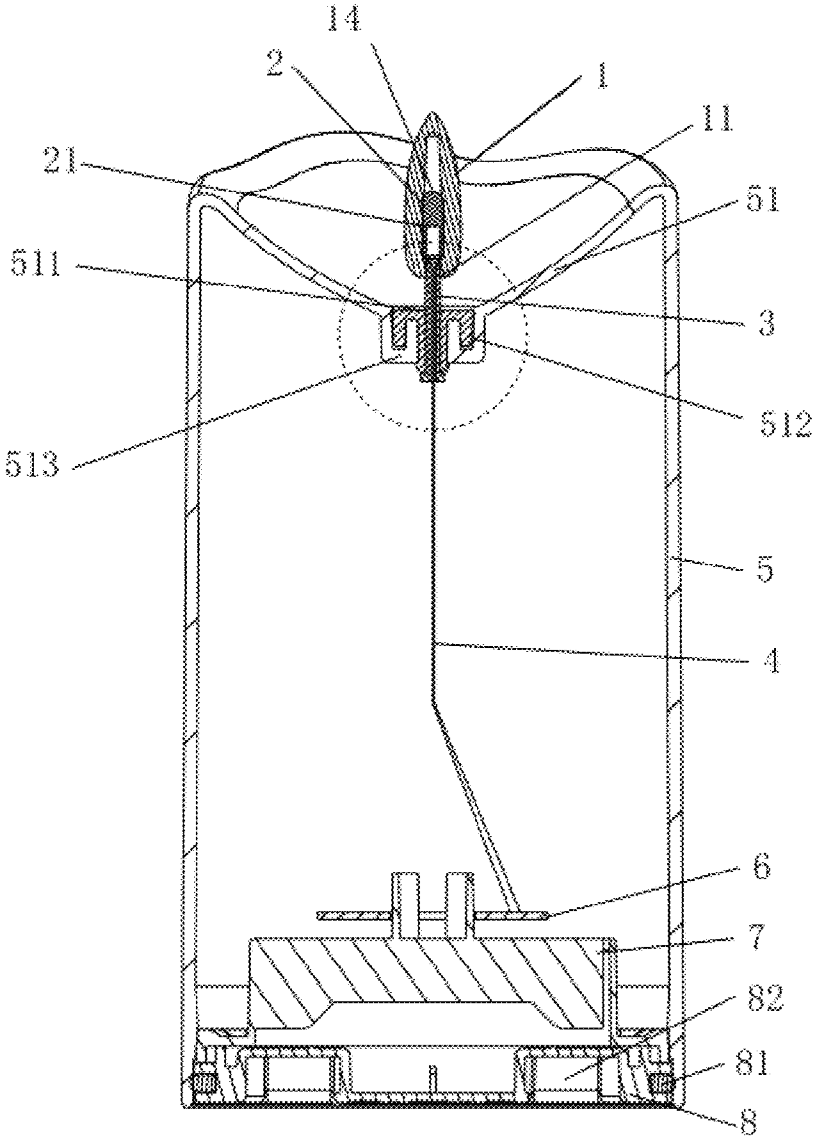
FIG. 3 is a sectional view of a flameless candle according to an embodiment of the present disclosure.

Referring to FIG. 3, FIG. 3 shows a sectional view of a flameless candle according to an embodiment of the present disclosure, as shown in FIG. 3, the flameless candle comprises a lighting assembly, comprising a lighting housing 5 and a light head 1 as described above, the light head is provided at one end of the lighting housing 5.

In this embodiment, the lighting housing 5 is milky white, and in other examples, the lighting housing 5 may be made of other types of plastic and its color may be milky white or yellowish white.

In a specific embodiment, the lighting housing 5 comprises a base 51 for holding the hollow sleeve 3, the base 51 is provided with a hollow sleeve mounting hole 511, the base 51 further comprises a hollow silicone plug 512, the hollow silicone plug 512 is sealingly fitted with the hollow sleeve mounting hole 511, and the inner diameter of the hollow silicone plug 512 is equal to or slightly smaller than the outer diameter of the hollow sleeve 3 of the light head 1, so as to realize the fixed connection of the lighting housing 5, the hollow sleeve 3 and the hollow silicone plug 512, and ensure the waterproof performance among the three.

In a specific embodiment, the periphery of the hollow sleeve mounting hole 511 is further provided with a secondary sealing groove 513, and the hollow silicone plug 512 is provided with an annular sealing bulge corresponding to the secondary sealing groove 513, which can realize the internal fixed connection of the hollow silicone plug 512 and the lighting housing 5, and can further improve the waterproof performance to protect the internal components of the housing.

In a specific embodiment, the upper surface of the base 51 is provided with a gradual shrinking structure, which is in the axial direction at one end of the lighting housing 5 having the light head, and the lowest point of the gradual shrinking structure is located at the edge of one end of the lighting housing 5, through which the water can be effectively guided to discharge the upper end of the lighting housing 5 in time to avoid water leakage to the inside of the housing resulting in short circuit of the internal components.

In a specific embodiment, the flameless candle further comprises a PCBA circuit board 6, a battery compartment 7 and a rotary cover 8, the interior hollow of the lighting housing 5, the wire for the light source 4, the PCBA circuit board 6 and the battery compartment 7 are connected sequentially and is all provided within the interior of the lighting housing 5, and the rotary cover 8 is detachably connected to the bottom of the lighting housing 5, the battery compartment 7 is provided with a pair of battery slots accommodate batteries, and a sealing cover is provided at the fit of the battery slots and the PCBA circuit board 6, the outer diameter of the sealing cover is sealingly fitted with the inner diameter of the lighting housing 5, a switch slot is provided at the outer surface of the sealing cover close to the battery slots, and a limited sliding grooved rail is provided in the switch slot, circuit-on/off switch installed in the switch slot is used for controlling the circuit-on/off by moving back and forth along the limited sliding grooved rail. The PCBA circuit board 6 is placed horizontally above the battery compartment 7, the battery compartment 7 is electrically connected to the PCBA circuit board 6, the battery compartment 7 provides power for light source 2, the PCBA circuit board 6 controls the light source 2 light, the battery slots are used to accommodate the battery, the switch slot accommodate the limited sliding grooved rail, the limited sliding grooved rail enables the circuit-on/off switch to move back and forth in the sliding grooved rail, the circuit-on/off switch control circuit-on/off.

In a particular embodiment, a sealing ring 81 is provided at the fitting place of the rotary cover 8 and lighting housing 5, the sealing ring 81 is made of silicone material, in this embodiment, the color of the sealing ring 81 is black, in other embodiments, the color may be milky white or other colors, and the surface of the rotary cover 8 is provided with at least one pair of grip grooves 82. The grip grooves 82 are used to lock or unlock the rotary cover 8, which can be grabbed out after being unlocked.

The working principle of a flameless candle:

The circuit on-off switch is used for controlling the circuit on-off, the battery compartment provides power for the light source, the PCBA circuit board controls the light source, the PCBA circuit board controls the LED light through the wire for the light source, the LED of the light source passes the light along the light-transmitting chamber to the light head housing through the corresponding the light transmitting portion, the light emitted by the light source passes through the light head housing, and the light source passes through the light head housing. It simulates the flame of a real candle.

In the description of this specification, the reference terms “an embodiment”, “some embodiments”, “examples”, “specific examples”, or “some examples”, etc., refer to the specific features, structures, materials, or characteristics incorporated in the embodiment or description of the example contained in at least one embodiment or example of the present disclosure. In this specification, schematic representations of the above terms must not be directed to identical embodiments or examples. Further, the specific features, structures, materials or features described may be combined in a suitable manner in any one or more embodiments or examples. In addition, without contradicting each other, persons skilled in the art may combine and combine the different embodiments or examples described in this specification and the characteristics of different embodiments or examples.

Although embodiments of the present disclosure have been shown and described above, it can be understood that the embodiments are exemplary and cannot be understood as limitations of the present disclosure, and that the embodiments may be changed, modified, replaced and modified by ordinary technicians in the field within the scope of the present disclosure.

The specific implementation mode of the present disclosure does not constitute the limitation of the scope of protection of the present disclosure. Any other corresponding changes and deformation made according to the technical idea of the present disclosure shall be comprised in the protection scope of the claims of the present disclosure.

The invention claimed is:

1. A light head for a flameless candle, comprising a light head housing and a light source, wherein the light head housing is made of silicone material by integrally-forming, the light head housing comprises an inner chamber and a through hole for connecting the inner chamber to the outside, the inner chamber comprises a large chamber for accommodating the light source and a light-transmitting chamber connected with the large chamber, wherein the light-transmitting chamber is elongated and is configured to reserve a certain distance for the light to make the light source emit light more evenly, and wherein an inner diameter of the light-transmitting chamber is smaller than an inner diameter of the large chamber.

2. The light head for a flameless candle according to claim 1, wherein the inner diameter of the through hole is smaller than the inner diameter of the large chamber.

3. A lighting assembly for a flameless candle comprising a lighting housing and a light head according to claim 2, the light head being provided at one end of the lighting housing, wherein the lighting housing comprises a base for holding the hollow sleeve, the base is provided with a hollow sleeve mounting hole, the base further comprises a hollow silicone plug, the hollow silicone plug is sealingly fitted with the hollow sleeve mounting hole, and the inner diameter of the hollow silicone plug is equal to or slightly smaller than the outer diameter of the hollow sleeve of the light head, the periphery of the hollow sleeve mounting hole is further provided with a secondary sealing groove, and the hollow silicone plug is provided with an annular sealing bulge corresponding to the secondary sealing groove.

4. The light head for a flameless candle according to claim 1, wherein the light source is installed in the large chamber, the light source comprises an LED and a light transmitting portion, and the LED is provided in the light transmitting portion, the light transmitting portion is provided in the large chamber, and an outer diameter size of the light transmitting portion is slightly smaller than the inner diameter size of the large chamber.

5. A lighting assembly for a flameless candle comprising a lighting housing and a light head according to claim 4, the light head being provided at one end of the lighting housing, wherein the lighting housing comprises a base for holding the hollow sleeve, the base is provided with a hollow sleeve mounting hole, the base further comprises a hollow silicone plug, the hollow silicone plug is sealingly fitted with the hollow sleeve mounting hole, and the inner diameter of the hollow silicone plug is equal to or slightly smaller than the outer diameter of the hollow sleeve of the light head, the periphery of the hollow sleeve mounting hole is further provided with a secondary sealing groove, and the hollow silicone plug is provided with an annular sealing bulge corresponding to the secondary sealing groove.

6. The light head for a flameless candle according to claim 1, wherein further comprising a hollow sleeve, an end of the hollow sleeve is inserted into the through hole and interference-fitted with the through hole, and a wire for the light source is further comprised to extend through the large chamber from the interior of the hollow sleeve.

7. A lighting assembly for a flameless candle comprising a lighting housing and a light head according to claim 6, the light head being provided at one end of the lighting housing, wherein the lighting housing comprises a base for holding the hollow sleeve, the base is provided with a hollow sleeve mounting hole, the base further comprises a hollow silicone plug, the hollow silicone plug is sealingly fitted with the hollow sleeve mounting hole, and the inner diameter of the hollow silicone plug is equal to or slightly smaller than the outer diameter of the hollow sleeve of the light head, the periphery of the hollow sleeve mounting hole is further provided with a secondary sealing groove, and the hollow silicone plug is provided with an annular sealing bulge corresponding to the secondary sealing groove.

8. The light head for a flameless candle according to claim 1, wherein a jointing part between the large chamber and the light-transmitting chamber comprises a position-limiting portion for limiting the installation position of the light source.

9. The light head for a flameless candle according to claim 8, wherein the position-limiting portion has a concave profile matching with the outline of the light source.

10. A lighting assembly for a flameless candle comprising a lighting housing and a light head according to claim 9, the light head being provided at one end of the lighting housing, wherein the lighting housing comprises a base for holding the hollow sleeve, the base is provided with a hollow sleeve mounting hole, the base further comprises a hollow silicone plug, the hollow silicone plug is sealingly fitted with the hollow sleeve mounting hole, and the inner diameter of the hollow silicone plug is equal to or slightly smaller than the outer diameter of the hollow sleeve of the light head, the periphery of the hollow sleeve mounting hole is further provided with a secondary sealing groove, and the hollow silicone plug is provided with an annular sealing bulge corresponding to the secondary sealing groove.

11. A lighting assembly for a flameless candle comprising a lighting housing and a light head according to claim 5, the light head being provided at one end of the lighting housing, wherein the lighting housing comprises a base for holding the hollow sleeve, the base is provided with a hollow sleeve mounting hole, the base further comprises a hollow silicone plug, the hollow silicone plug is sealingly fitted with the hollow sleeve mounting hole, and the inner diameter of the hollow silicone plug is equal to or slightly smaller than the outer diameter of the hollow sleeve of the light head, the periphery of the hollow sleeve mounting hole is further provided with a secondary sealing groove, and the hollow silicone plug is provided with an annular sealing bulge corresponding to the secondary sealing groove.

12. A lighting assembly for a flameless candle comprising a lighting housing and a light head according to claim 1, the light head being provided at one end of the lighting housing, wherein the lighting housing comprises a base for holding the hollow sleeve, the base is provided with a hollow sleeve mounting hole, the base further comprises a hollow silicone plug, the hollow silicone plug is sealingly fitted with the hollow sleeve mounting hole, and the inner diameter of the hollow silicone plug is equal to or slightly smaller than the outer diameter of the hollow sleeve of the light head, the periphery of the hollow sleeve mounting hole is further provided with a secondary sealing groove, and the hollow silicone plug is provided with an annular sealing bulge corresponding to the secondary sealing groove.

13. A flameless candle, wherein comprising the lighting assembly for a flameless candle according to claim 12.

14. The flameless candle according to claim 13, wherein further comprising a PCBA circuit board, a battery compartment and a rotary cover, the interior hollow of the lighting housing, the wire for the light source, the PCBA circuit board and the battery compartment are connected sequentially and are all provided within the interior of the lighting housing, and the rotary cover is detachably connected to the bottom of the lighting housing, the battery compartment is provided with a pair of battery slots accommodating batteries, and a sealing cover is provided at the fit of the battery slots and the PCBA circuit board, the outer diameter of the sealing cover is sealingly fitted with the inner diameter of the lighting housing, a switch slot is provided at the outer surface of the sealing cover close to the battery slots, and a limited sliding grooved rail is provided in the switch slot, circuit-on/off switch installed in the switch slot is used for controlling the circuit-on/off by moving back and forth along the limited sliding grooved rail.

15. A flameless candle according to claim 14, wherein a sealing ring is provided between the rotary cover and the lighting housing, the surface of the rotary cover is provided with at least a pair of grip grooves, and the grip grooves are used for locking or unlocking the rotary cover.

* * * * *